(12) United States Patent
Fan et al.

(10) Patent No.: US 10,176,077 B2
(45) Date of Patent: Jan. 8, 2019

(54) GENERATING BREAKPOINTS FOR CROSS-LAYER DEBUGGING

(71) Applicant: INTERNATIONAL BUSINESS MACHINES CORPORATION, Armonk, NY (US)

(72) Inventors: Si Bin Fan, Beijing (CN); Xiao Feng Guan, Shanghai (CN); Chen Jiang, Beijing (CN); Yan Rong Shen, Beijing (CN); Chang Ning Song, Beijing (CN); Ping Xiao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 15/434,187

(22) Filed: Feb. 16, 2017

(65) Prior Publication Data
US 2018/0232297 A1 Aug. 16, 2018

(51) Int. Cl.
*G06F 9/44* (2018.01)
*G06F 11/36* (2006.01)

(52) U.S. Cl.
CPC ................ *G06F 11/3624* (2013.01)

(58) Field of Classification Search
CPC .................. G06F 11/362; G06F 11/3624
USPC .................................................. 717/124–135
See application file for complete search history.

(56) References Cited

U.S. PATENT DOCUMENTS

| 6,634,020 B1* | 10/2003 | Bates ................ G06F 11/362 |
| | | 712/227 |
| 8,752,025 B2 | 6/2014 | Bates |
| 8,880,952 B1 | 11/2014 | Labonte et al. |
| 8,930,909 B1 | 1/2015 | Elliott et al. |
| 9,292,413 B2 | 3/2016 | Faillaci, III et al. |
| 2008/0127113 A1* | 5/2008 | Wu ................ G06F 11/3644 |
| | | 717/129 |

(Continued)

OTHER PUBLICATIONS

"A Quick-Start Tutorial on Relational Database Design," <https://www.ntu.edu.sg/home/ehchua/programming/sql/Relational_Database_Design.html>, Sep. 2010, p. 1-7.*

(Continued)

*Primary Examiner* — Qing Chen
(74) *Attorney, Agent, or Firm* — Cantor Colburn LLP; William A. Kinnaman, Jr.

(57) ABSTRACT

A computer implemented method for selecting breakpoints for cross-layer debugging is provided. The method includes receiving code comprising a plurality of layers, and executing a static analysis of the code to obtain a use-definition (UD) chain, alias information, and a parameter mapping for each of the plurality of layers. The method also includes determining a statement of the code that produces one of an error and a failure, and generating a table comprising a plurality of fields including a working statement field, watching variable field, and a watching function field. The method includes adding the determined statement to the working statement field and performing a cross-layer analysis includes identifying at least one used variable and its associated alias as watching variables from the added working statement, searching the code based on the watching variable field. The method includes generating cross-layer suspect code points based on the cross-layer analysis.

20 Claims, 7 Drawing Sheets

(56) References Cited

U.S. PATENT DOCUMENTS

| | | | |
|---|---|---|---|
| 2008/0168428 A1 | 7/2008 | Bates et al. | |
| 2013/0326276 A1* | 12/2013 | Hu | G06F 11/26 714/37 |
| 2015/0161023 A1 | 6/2015 | Bragstad et al. | |
| 2015/0234724 A1* | 8/2015 | Hu | G06F 11/26 714/37 |
| 2016/0154726 A1* | 6/2016 | Guan | G06F 11/3636 717/128 |

OTHER PUBLICATIONS

Hajnal, et al., "A Precise Demand-Drive Definition-Use Chaining Algorithm", 2002 IEEE; 10 pgs.

Oracle "Using the Debugger to Debug the Application" URL: http://download.oracle.com/otn_hosted_doc/developer/904preview/tutorials/ide/tutide_appdebug.html; downloaded Aug. 3, 2016; 3 pgs.

* cited by examiner

| Working statement | Watching function | Watching variable |
|---|---|---|
| (12) | foo | b |
| (9) | foo | a |
| (8) | foo | mem_t, x |
| (35) | bar | - |
| (51) | foobar | y |

402 — Working statement
404 — Watching function
406 — Watching variable

| Use/ variable | Last definitions | | |
|---|---|---|---|
| | a | b | mem_t | x |
| (7) | | | | |
| (8) | (7) | | | |
| (9) | (8) | | (-) | |
| (12) | (9) | (9) | | (7) |

502 — Use/variable
504 — Last definitions

| Working statement | Watching function | Watching variable |
|---|---|---|
| {12} | foo | b, c |
| {11} | foo | c, b |
| {25} | bar | y, mem_r |
| {24} | bar | pa, var |
| ... | | |

- 602 Working statement
- 604 Watching function
- 606 Watching variable
- 610 {12}
- 612 {11}
- 614 {25}
- 616 {24}
- 618 ...

| Use/ Variable | Last definitions | | | |
|---|---|---|---|---|
| | a | b | c | mem_t | x |
| {7} | | | | | |
| {8} | | | | (-) | (7) |
| {9} | (8) | | | | |
| {10} | (8) | (9) | | | |
| {11} | | (9) | (10) | (-) | |
| {12} | | (11) | (11) | | |
| (...) | | | | | |

- 702 Use/Variable
- 704 Last definitions
- 710 {7}
- 712 {8}
- 714 {9}
- 716 {10}
- 718 {11}
- 720 {12}
- 722 (...)

| Use / variable | Last definitions | | | | |
|---|---|---|---|---|---|
| | pa | pb | var | mem_r | y |
| (23) | - | - | - | - | - |
| (24) | (23) | - | (23) | - | - |
| (25) | - | - | - | (-) | (24) |
| (EOF) | (23) | (25) | (23) | - | (24) |

GENERATING BREAKPOINTS FOR CROSS-LAYER DEBUGGING

BACKGROUND

The present invention relates to debugging, and more specifically, to a method and implementation to select breakpoints for cross-software layer debugging.

In today's environment, applications utilize a common architecture model including the presentation layer, the business logic layer, and the data access layer. The layer based architecture reduces the complexity of software development and allows the different layers to be coded in different programming languages. After the code has been developed, the code must be debugged to find and resolve defects that can prevent the correct operation of the computer software or a system.

Breakpoints can be set in a program code for debugging purposes. When a debugger reaches a breakpoint in the code it will temporarily suspend the execution of the program code. At this time, the program code can be examined to check the various states and positions to identify violations or bugs in the code. Breakpoints are used to facilitate the debugging process.

SUMMARY

A computer implemented method for selecting breakpoints for cross-layer debugging is provided. The method includes receiving code comprising a plurality of layers, each layer including at least one statement, and executing a static analysis of the code to obtain a use-definition (UD) chain, alias information, and a parameter mapping for each of the plurality of layers. The method also includes determining a statement of the code that produces one of an error and a failure, and generating a table comprising a plurality of fields including a working statement field, watching variable field, and a watching function field. The method includes adding the determined statement as a working statement to working statement field and adding a function associated with the determined statement to the watching function field. The method includes performing a cross-layer analysis, the cross-layer analysis includes identifying at least one used variable and its associated alias as watching variables from the added working statement, searching the code based on the watching variable field, wherein the searching includes searching at least one UD chain for a last definition of the watching variable field, and determining a type of the last definition of the watching variable field. The method includes generating cross-layer suspect code points based on the cross-layer analysis.

A computer program product for selecting breakpoints for cross-layer debugging is provided. The computer program product includes a computer readable storage medium having stored thereon first program instructions executable by a processor to cause the processor to receive code comprising a plurality of layers, each layer including at least one statement, and execute a static analysis of the code to obtain a use-definition (UD) chain, alias information, and a parameter mapping for each of the plurality of layers. The first program instructions are further executable by the processor to cause the processor to determine a statement of the code that produces one of an error and a failure, generate a table comprising a plurality of fields including a working statement field, watching variable field, and a watching function field, and add the determined statement as a working statement to the working statement field. The first program instructions are further executable by the processor to cause the processor to add a function associated with the determined statement to the watching function field. The first program instructions are further executable by the processor to cause the processor to perform a cross-layer analysis, the cross-layer analysis comprises identifying at least one used variable and its associated alias as watching variables from the added working statement, searching the code based on the watching variable field, wherein the searching includes searching at least one UD chain for a last definition of the watching variable field, and determining a type of the last definition of the watching variable field. The first program instructions are further executable by the processor to cause the processor to generate cross-layer suspect code points based on the cross-layer analysis.

A system for selecting breakpoints for cross-layer debugging is provided. The system includes a processor coupled to a storage medium and an analyzer configured to receive code comprising a plurality of layers, each layer including at least one statement, and execute a static analysis of the code to obtain a use-definition (UD) chain, alias information, and a parameter mapping for each of the plurality of layers. The processor is also configured to determine a statement of the code that produces one of an error and a failure, generate a table comprising a plurality of fields including a working statement field, watching variable field, and a watching function field, and add the determined statement as a working statement to the working statement field. The processor is configured to add a function associated with the determined statement to the watching function field. The processor is also configured to perform a cross-layer analysis, the cross-layer analysis comprises identifying at least one used variable and its associated alias as watching variables from the added working statement, searching the code based on the watching variable field, wherein the searching includes searching at least one UD chain for a last definition of the watching variable field, and determining a type of the last definition of the watching variable field. The processor is also configured to generate cross-layer suspect code points based on the cross-layer analysis.

DETAILED DESCRIPTION

In accordance with embodiments of the disclosure computer implemented methods, computer program products, and systems for selecting breakpoints for cross-layer debugging are provided.

The technique includes receiving code comprising a plurality of layers, each layer including at least one statement, and executing a static analysis of the code to obtain a use-definition (UD) chain, alias information, and a parameter mapping for each of the plurality of layers. The technique also includes determining a statement of the code that produces one of an error and a failure, and generating a table comprising a plurality of fields including a working statement field, watching variable field, and a watching function field. The technique includes adding the determined statement as a working statement to the working statement field, adding a function associated with the determined statement to the watching function field, and performing a cross-layer analysis, the cross-layer analysis includes identifying at least one used variable and its associated alias as watching variables from the added working statement, searching the code based on the watching variable field, wherein the searching includes searching at least one UD chain for a last definition of the watching variable field, and determining a type of the last definition of the watching variable field. The technique includes generating cross-layer suspect code points based on the cross-layer analysis.

In today's environment, application problems are easily recognizable in the presentation layer. However, the root of the issue may exist in a different one of the several layers. Issues in debugging can arise when debugging multiple layers of the application. The complexity increases when the different layers are managed by a different operator and are programmed in different programming languages.

A failure in the presentation layer can be associated with several other layers to determine the root cause of the failure. In one or more embodiments, the back-end logic code from the presentation layer will be debugged. In one or more embodiments, cross-layer debugging is more feasible. In one or more embodiments, cross-layer debugging is enabled to determine the root cause of the failure that is displayed in the presentation layer.

In order to identify the error, a programmer will be challenged with analyzing each change in the business logic layer and data access layers to discover any issue that may be embedded within the code. It can become impossible to monitor each change manually as the number functions and lines of code increase. Generally, issues exist prior to the realization of an error in the bad output at the presentation layer.

In one or more embodiments, a software debugger is provided with statements and variables from all software layers that are associated with the cause of the failure, regardless of which layer the failure occurred. In order to reach the problematic code, programmers spend a substantial amount of time developing test cases for each of the layers of code to identify these issues.

Figure 1:
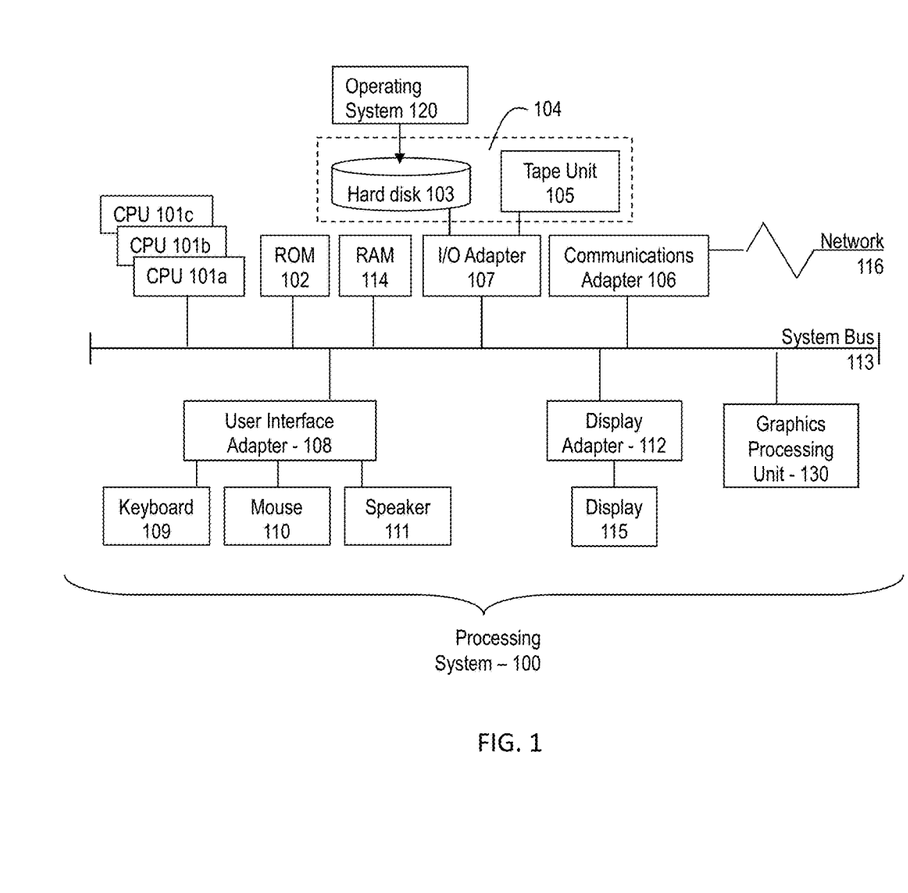
FIG. 1 is a block diagram illustrating an embodiment of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
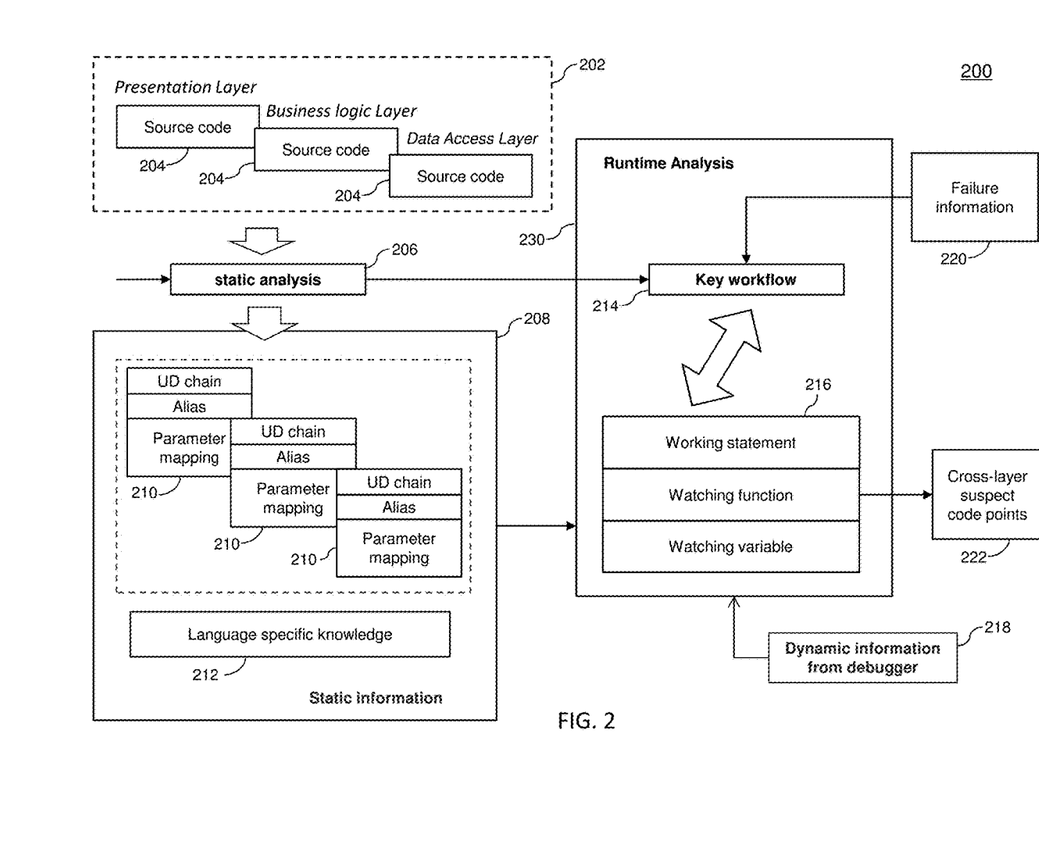
FIG. 2 provides a system for implementing an embodiment for selecting breakpoints for cross-layer debugging.

With reference now to FIG. 2, a diagram 200 illustrating an embodiment for selecting breakpoints for cross-layer debugging is shown. Block 202 depicts a program comprised of multiple layers of source code 204. In one or more embodiments, the source code 204 includes the presentation layer, business logic layer, and data access layer. Each code layer 204 includes one or more statements, functions, and/or definitions. Block 206 illustrates a static analysis being performed on the layers of code 204. Block 208 provides the pre-processing information collected from the static analysis of the code, wherein pre-processing information 210 includes use-definition UD chain information, alias information, and parameter mapping information. Static analysis, also called static code analysis, is a method of computer program debugging that is performed by examining the code without executing the program. The process provides an understanding of the code structure, and can help to ensure that the code adheres to industry standards. A use-definition UD chain is a data structure that consists of a use of a variable, and all of the definitions of that variable that can reach the particular use without any other intervening definitions. In one or more embodiments, the UD chain is used to locate the last definition of a used variable. A UD chain can be generated and the alias and parameter mapping information can be determined from a static analysis. In one or more embodiments, the UD chain and alias information can be retrieved from the compiling of the code. Also, the complier can generate parameter mapping information to handle function calls when crossing function boundaries.

In one or more embodiments, when crossing function/software layer boundaries, the technique described herein will leverage the parameter mapping information 210 and language specific information 212. The language specific knowledge can also be collected for each code layer during the compiling of the code. In one or more embodiments, the language used for each layer can be different from one another. For example, a presentation layer can be coded using Python, the business logic layer can be coded using C++, and the data access layer can be coded using C. The method can maintain information regarding the coding type associated with each layer and can be used when performing a cross-layer analysis.

FIG. 2 illustrates how the UD chain information, alias information, and parameter mapping information are determined for each layer. The analyzer 214 represents a module for executing the workflow that processes the working statements, watching functions, and watching variables information 216 that are generated by the method described. In one or more embodiments, the block 230 provides the information is processed as during a run-time analysis of the code. The analyzer 214 can also receive dynamic information from the debugger 218 and failure information 220 indicating a failure in any layer of the code. Analyzer 214 processes the information to generate the cross-layer suspect code points 222 for use in debugging the problematic code.

Figure 3:
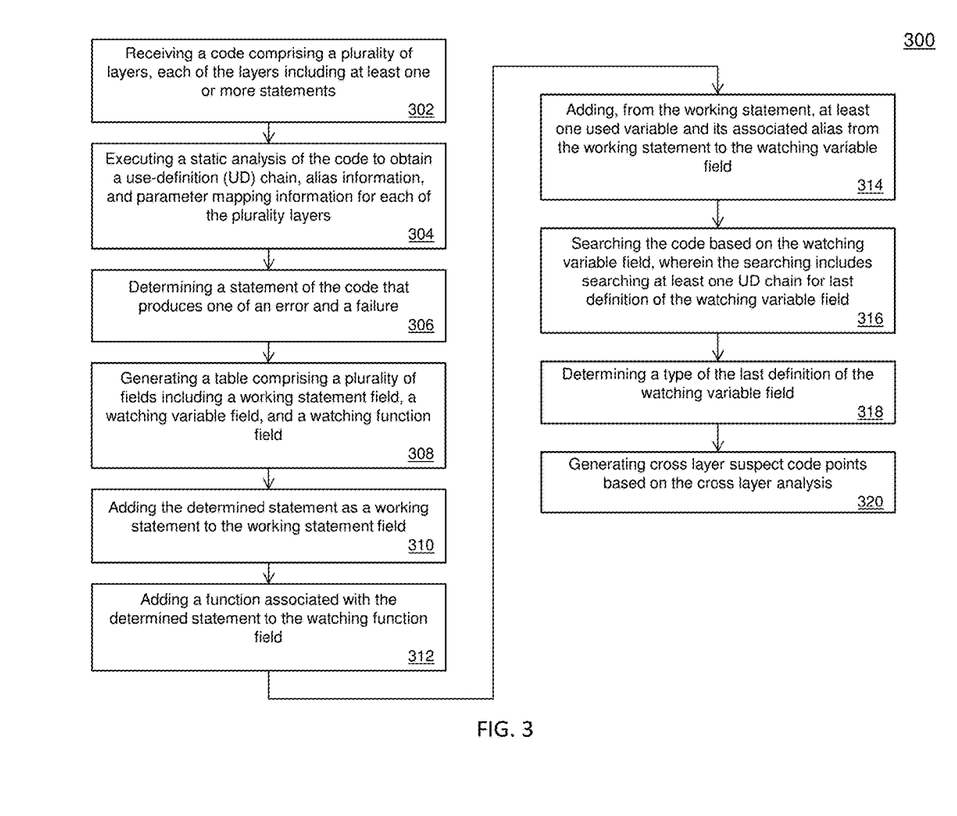
FIG. 3 illustrates a flow diagram for selecting breakpoints for cross-layer debugging.

Referring now to FIG. 3, a method 300 for selecting breakpoints for cross-layer debugging is shown. Block 302 provides receiving code comprising a plurality of layers. In one or more embodiments, the plurality of layers includes the presentation layer, the business logic layer, and the data access layer. Block 304 provides executing a static analysis of the code to obtain use-definition (UD) chain information, alias information, and a parameter mapping information for each of the plurality of layers. In one or more embodiments, the UD chains are analyzed to determine the last definitions of a watching variable, wherein the initial watching variable is based on the variable returning an error in the code. Embodiments also include obtaining the alias information for a variable and conducting the analysis based on the UD chain. In other embodiments, parameter maps are used for mapping parameters of a function to parameters of associated functions. In an example, the parameters of a caller function can be mapped to the parameters of the callee function.

Figure 4:
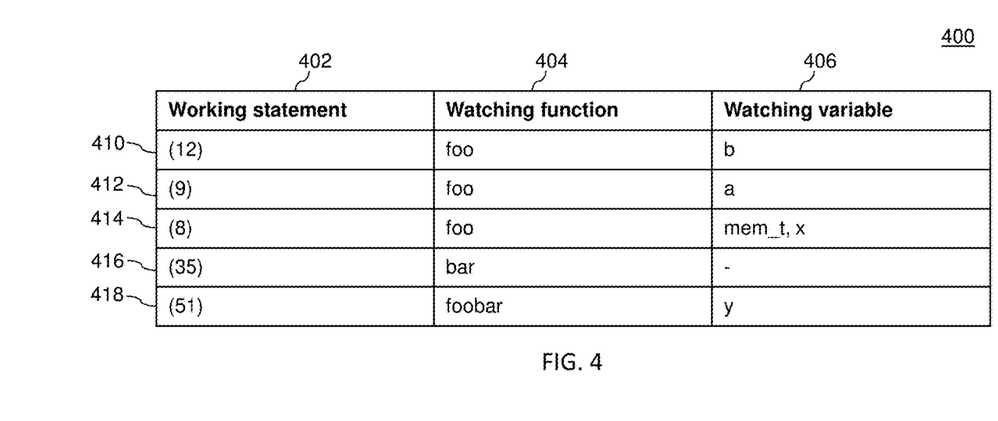
FIG. 4 illustrates a table in accordance with an embodiment for selecting breakpoints for cross-layer debugging.

Block 306 provides determining a statement of the code producing one of an error and a failure. In one or more embodiments, an error, unexpected value, or failure may be realized in the presentation layer affecting a user interface (UI) that is presented to a user. Block 308 provides generating a table comprising a plurality of fields including a working statement field, a watching function field, and a watching variable field. These fields are constantly populated during the analysis to show the statements and variables that affect the failure. An example table 400 for selecting breakpoints for cross-layer debugging is shown in FIG. 4.

Block 310 provides adding the determined statement as a working statement to the working statement field. The working statement is the current statement of the code that is under analysis. In one or more embodiments, the determined statement is the initial statement where the error or failure occurred. After the error or failure has been identified, the process continues its analysis from the statement causing the problems. Block 312 includes adding a function associated with the determined statement to the watching function field. In an embodiment, the function is a function that includes the working statement.

Block 314 provides adding, from the working statement, at least one used variable and its associated alias from the working statement to the watching variable field. Block 316 provides searching the code based on the watching variable field, wherein the searching includes searching at least one UD chain for the last definition of the watching variable field.

Block 318 provides determining a last definition type of the last definition of the watching variable field. In one or more embodiments, a last definition type includes a function call, a function definition, or a normal statement. A normal statement is a type of statement that is neither a function call nor a function definition. The subsequent processing will be determined based on the last definition type to be described later. Block 320 provides generating cross-layer suspect code points based on the table. In one or more embodiments, the code breakpoints are used to guide a programmer when debugging problematic code.

FIG. 4 depicts a watching set in table 400 for selecting breakpoints for cross-software layer debugging. Table 400 illustrates a working statement set in column 402, a watching function set in column 404, and a watching variable set in column 406. The watching variables from a watching variable set 406, which include a set of variables that may affect the initial variable. In one or more embodiments, the initial variable can be selected by a system operator or can be determined based on the variable directly causing a failure. In one or more embodiments, each variable in the watching set will be analyzed to determine the root cause of the failure. The working statement pool 402 contains the set of working statements that will be analyzed and the watching functions 404 indicate which functions each working statement and watching variable are associated with.

The watching set of table 400 has been generated by the method of analyzing the code described in FIG. 3. Each row of table 400 includes a combination of a working statement, watching function, and a watching variable. In a specific example, the watching set of table 400 has been generated for the following code:

In an example, consider the following code:

```
(7) void foo(x) {
(8)     a = mem_t + x;
(9)     b = a * 3;
...
(12)    // write b to dialogue
...
(20) void bar( ) {
...
(35)    mem_t = 3;
...
(50) void foobar(y) {
(51)    foo(y);
```

The code provides an example having only 3 functions. For simplicity, some code and detail information have been omitted for the "bar" and "foobar" functions of the code.

As part of the pre-processing, the UD chain information for each function of the code is generated. In addition, the alias information and the parameter mapping information will also be generated at the same time by a compiler. The last definition of the watching variable 'b' is searched in the UD chain because the variable 'b' was determined to cause an error in the code. A search up the UD chain will be performed to locate the last definition of the watching variable.

Figure 5:
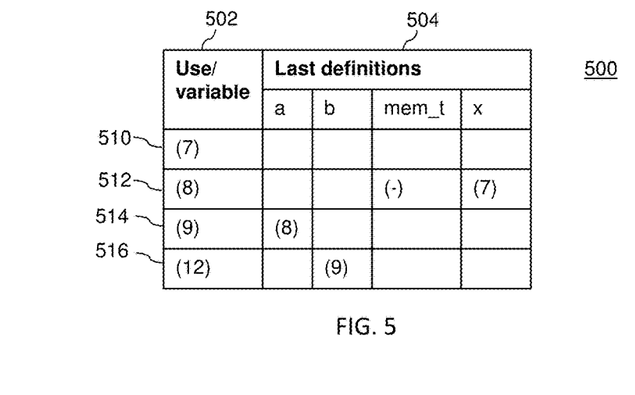
FIG. 5 illustrates a UD (use-definition) chain in accordance with an embodiment for selecting breakpoints for cross-layer debugging.

FIG. 5 provides a UD chain 500 for the "foo(x)" function of the code provided above. Column 502 provides the statement number that includes a last definition. The columns under the last definitions column 504 provide the different variables that are used within the foo(x) function of the UD chain. In this example, because variable 'b' was determined to return an error the analysis begins searching from the last definition for the variable 'b.' In one or more embodiments, the error can occur in any layer including the presentation layer, business logic layer, or the data access layer. Row 516 shows that the variable 'b' is used in statement (12) and the variable 'b' is defined in statement (9). Now referring to statement (9) as shown in row 514, variable 'a' is used and is defined in statement (8). As the searching up the UD chain continues, row 512 of FIG. 5 shows that mem_t and variable 'x' are used where variable 'x' is referenced in statement (7). Row 510 shows that none of the variables are used in statement (7). In one or more embodiments, the UD chain was determined during a pre-processing by a compiler.

In one or more embodiments, the watching variable type can be determined. Responsive to determining that the watching variable type of the watching variable includes a global symbol type, a search up each UD chain for every function for the last definition of the watching variable is performed. Responsive to determining that the watching variable type of the watching variable includes a non-global symbol type, a search up the current UD chain for the last definition of the watching variables is performed.

In an example, the variable "b" of the code has been determined to cause an unexpected result and the initial variable for use in the analysis. The variable "b" will be placed into a watching set of table 400 to begin the analysis to identify the root cause. In one or more embodiments, if an alias exists for the variable, the alias will also be added to the watching set. As shown at row 410, the watching function 404, which is associated with the watching variable, will be set as the function "foo," and the working statement will be set to statement (12) in the working statement pool 402.

The next step of this technique is to locate the last definition of the variable "b" which is located in statement (9) of the code. As a result, statement (9) which is determined to be a normal statement type (not a function call or function definition) will be added to the working statement pool 402 as shown at row 412. Working statement (9) will be analyzed to determine the used variables that are present in the statement. The used variable "a" of statement (9) will be added to the watching variable set 406 and the watching function 404 "foo" will remain unchanged.

The last definition of watching variable 'a' is statement (8) and will be added into the working statement pool 402 as depicted in row 414 of the watching set of table 400. Statement (8) is a normal statement type. The used variable 'x' and mem_t are added to the watching variable set 406 as shown in row 414 of FIG. 4. The watching function will remain unchanged.

Because watching variable mem_t is a global symbol, the analyzer will search for the last definition from each functions' UD chain information. In this example, the function "bar" has made use of mem_t located in statement (35) of the code. As a result statement (35) will be added to the working statement pool 402 and the watching function 404 will be indicated as the function "bar" as shown in row 416. Also, mem_t is not defined further in the code, therefore a nil character will be placed as the watching variable. In one or more embodiments, if the watching variable is a global variable and is found to be in one or more different functions, an additional analysis will occur for each of the functions containing the watching variable.

In addition, at row 414 watching variable 'x' is identified in statement (8). The last definition of 'x' is present in the function definition line and it is a parameter. Because the last definition is a function definition and the watching variable is a parameter, the analyzer will use the parameter mapping to continue the analysis. Where the watching variable is present in the function definition line and it is a parameter of the function, the analyzer can use backtrace information to trace its caller function. In this example, statement (51) is a callee function and the backtrace information provides that statement (7) as the caller function.

When the caller function is found the statement of the caller function will be added to the table as a working statement. In addition, the watching function of the caller function will be added to the table and a watching variable of the working statement will be added to the table. The formal parameter is mapped to the actual parameter.

As a result, statement (51) is the working statement, "foobar" is the watching function, and watching variable 'y' is obtained from mapping the formal parameter to the actual parameter. Row 418 includes the update. In one or more embodiments, if the caller function is not found in the current layer, the analyzer will search the symbol from another layer. In one or more embodiments the analyzer will use language specific rules to determine the parameter mapping.

The next line of the UD chain will be processed. The last definition of the updated watching variable will located, the last definition type will be determined, and the working statement will be updated. At the current working statement, the used variable will be added to the watching variable set and the processing will be continued. The alias will be added if applicable.

The sample code shown below provides an example where aliases are used.

```
(7)  void foo(x) {
(8)    a = mem_t + x;
(9)    b = a * 3;
(10)   & c = b;       // create an reference "c" to "b"
(11)   bar(a, c, mem_t); // function call can also have reference involved
(12)   // write b to dialogue
...
(23)  void bar(&pa, &pb, var) {
(24)   y = pa + var;
(25)   pb = y + mem_r;
...
```

Figure 6:
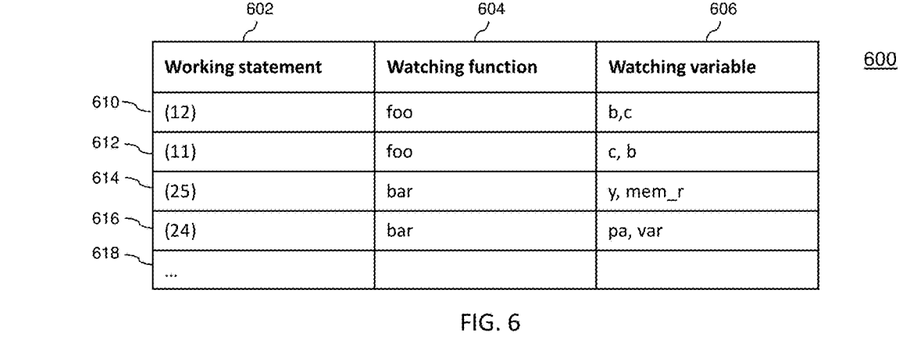
FIG. 6 illustrates a table in accordance with an embodiment for selecting breakpoints for cross-layer debugging.

In this particular example, the watching set of table 600 will be generated based on the technique described herein and the code provided above. Table 600 includes working statement pool 602, watching function set 604, and watching variable set 606. In an embodiment, an unexpected value is received at a particular code statement and it is determined that the variable 'b' will be analyzed as the initial variable.

Figure 7:
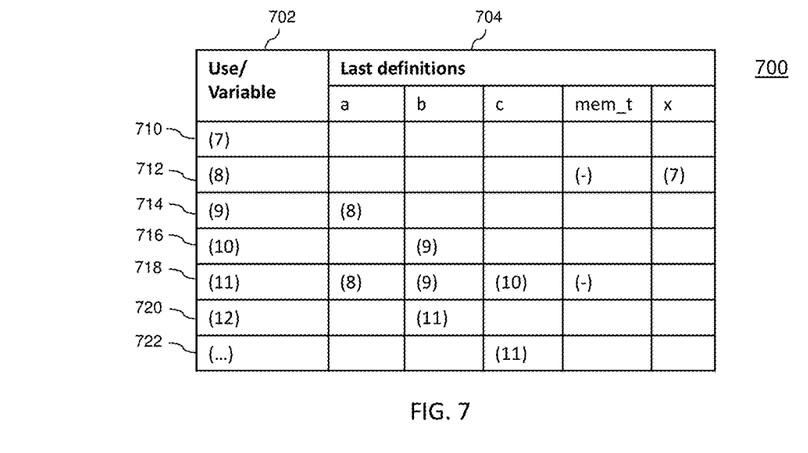
FIG. 7 illustrates a UD chain in accordance with an embodiment.

As part of the pre-processing the UD chain for the code is generated. FIG. 7 depicts the UD chain 700 generated for the "foo" function of the code. The use/variable column 702 provides each particular statement of the code and the variables used in each respective statement are shown under the columns of the last definitions 704.

The analyzer will further process UD chain 700 and search for the last definition of the variable 'c' because variable 'c' is aliased to variable 'b.' Row 722 is illustrative of the last line of the "bar" function of the code. The variable 'c' is used in the last line of the function as shown in row 722. Continuing to search up the UD chain of table 700, as shown in row 720, statement (12) uses the variable 'b' which is referenced in statement (11). After determining the statement is a normal statement the process continues the search up the UD chain 700.

As shown in row 718 of the UD chain, statement (11) uses the variables 'a,' 'b,' 'c,' and mem_t, where the used variables are defined in statements (8), (9), and (10), respectively. Row 716 shows statement (10) uses the variable 'b' which is defined in statement (9), row 714 shows that statement (9) uses variable 'a' which is referenced in statement (8). As shown in row 712, statement (8) uses mem_t and variable 'x' where the variable 'x' is referenced in statement (7), and row 710 provides statement (7) does not define any of the variables.

The watching set of table 600 shows in row 610 statement (12) is added as the working statement where variable 'b' was determined to cause the error and begins the focus of the analysis. Therefore the variable 'b' is added to the watching set 606. In addition, the variable 'c' will be added to the watching variable set 606 because 'c' is an alias for 'b.' Because variables 'b' and 'c' are normal statements, the process will continue to search up the UD chain 700 for the last definition after adding the variables to the table 600.

At row 612, statement (11) of the code is determined to be a function call that calls the "bar" function of statement (23). Therefore the process will continue from the last statement (25) of the "bar" callee function. The parameters of the "foo" caller function are mapped to the parameters of the "bar" callee function. As a result, row 614 provides adding statement (25) to the working statement pool 602 and the watching function set 604 is updated to include the "bar" function. Statement (25) of the code uses mem_r and variable 'y' which are both added to the watching variable set 606. Continuing to search up the UD chain statement (24) is added to the table 600 at row 616 in the working statement set 602. The watching function remains the "bar" function. The statement (24) uses the variables "pa" and "var" and are added to the watching variable set 606. The definition type of the variables will be determined and processing of the code will continue in accordance with the method of FIG. 3.

In this example, referring to FIG. 6, statement (11) (caller function) which is the last definition of variable 'c' is in a function call. The parameter 'c' will be mapped to formal parameter 'pb' of statement (23) (callee function). The UD function of the callee function will be searched to find the last definition of 'pb' (set as a watching variable) In this example, statement (25) defines 'pb' which uses 'y' and 'mem_r' The information from statement (25) is added to the table. In one or more embodiments, if the callee function is not located in the current layer, the analysis will also search for other layers' export symbols, using language specific knowledge to perform the parameter mapping.

As shown in the code provided above, statement (24) defines 'y' which uses variables 'pa' and 'var'. The process will continue to populate the table for each used variable until the last definition is found to be a function call where the watching variable is not a parameter. Row 618 can represent further analysis of the code in accordance with an embodiment. After the completion of the table 600, cross-layer code breakpoints can be set to debug the code based on the table.

Figure 8:
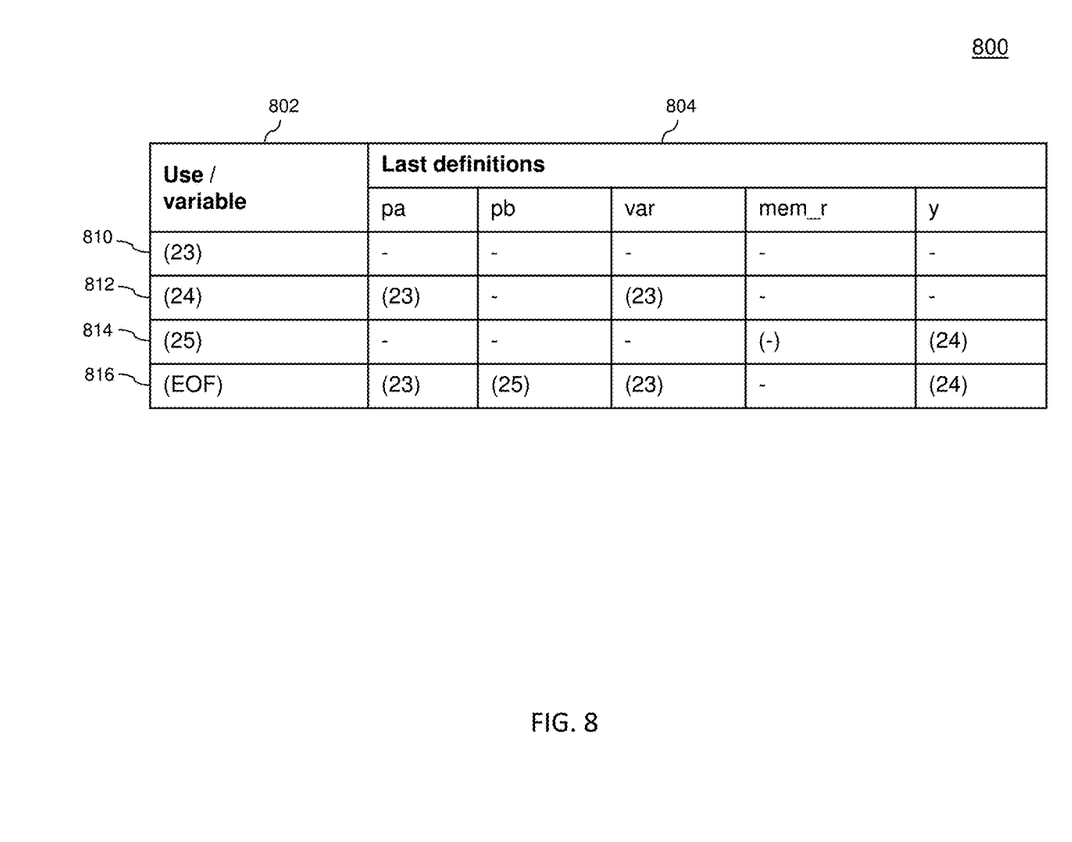
FIG. 8 illustrates a UD chain in accordance with an embodiment.

FIG. 8 illustrates a UD chain 800 for the "bar" callee function that was generated during the pre-processing of the code where column 802 represents the use/variable and column 804 represents the last definition of the variables. The function call in statement (11) calls the "bar" function represented by the UD chain. The UD chain 800 represents the "bar" function beginning at statement (23) of the code. Row 810 shows that none of the variables were used in statement (23) of the code and row 812 shows that the variables 'pa' and 'Afar' are used in statement (24). Row 814 shows that statement (25) uses the variable 'y' and mem_r. Row 816 provides the end of function EOF. The analyzer continues the search from the last statement of the function and searches up the UD chain in accordance with an embodiment.

The information can be used to determine where to set cross-layer suspect code points. The cross-software layer debugging described provides a technique to locate the problematic code across a plurality of software layers.

Figure 9:
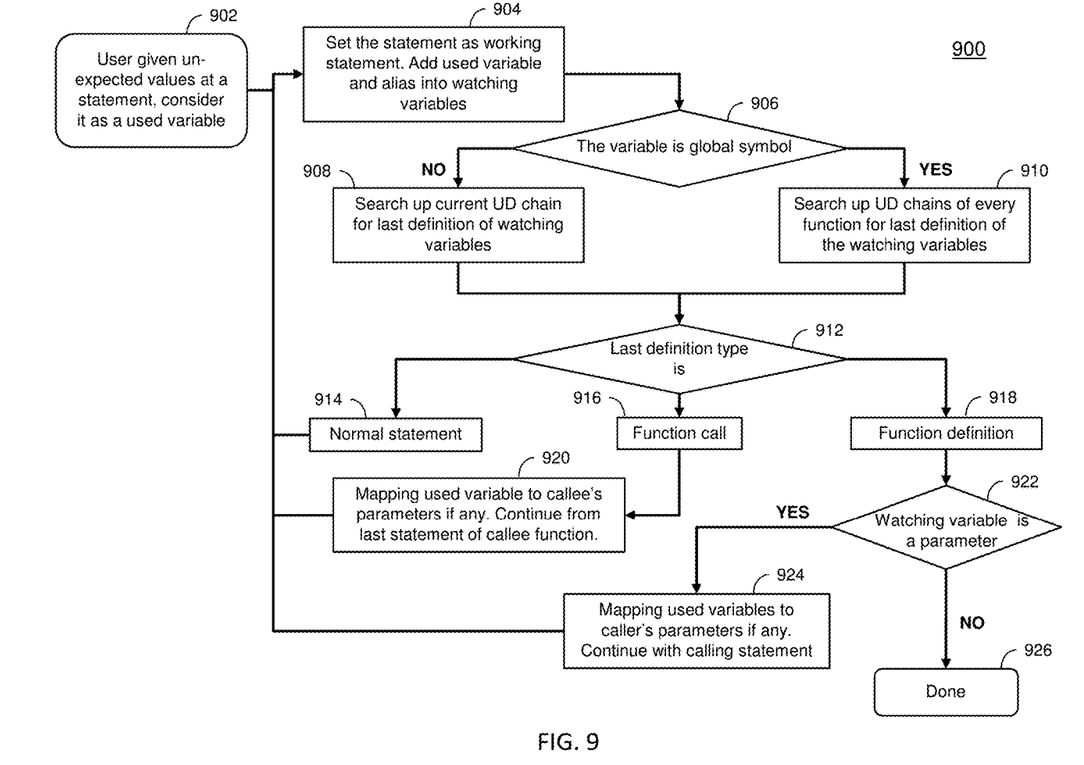
FIG. 9 illustrates a flow chart in accordance with an embodiment for selecting breakpoints for cross-layer debugging.

FIG. 9 depicts a flow chart 900 in accordance with an embodiment for selecting breakpoints for cross-software layer debugging. Block 902 provides that a user is given an unexpected value at a statement and considers it as a used variable for analysis. Block 904 provides setting the statement as the working statement of the watching set and adding the used variable and alias as watching variables. Block 906 provides determining whether the variable is a global symbol. If so, block 910 provides searching up UD chains of every function for the last definition of the watching variable. If not, block 908 provides searching up the current UD chain for the last definition of the watching variable. Next, block 912 provides determining the last definition type. There are three different last definition types which are normal statements 914, function calls 916, and function definitions 918. If the last definition type is a normal statement (neither a function call or function definition), then the process continues to block 904, where the statement is added as a working statement to the working statement field of the table and the cross-layer analysis is repeated based on the added working statement. If the last definition type is determined to be a function call, the callee function associated with the function call can be identified and the used variables can be mapped to the callee function's parameters if any exists. As shown in block 920, the used variables of the working statement can be mapped to the callee function's parameters if any exist and the process can continue from the last statement of the callee function before moving on to block 904, where the statement is added as a working statement to the working statement field of the table and the cross-layer analysis is repeated based on the added working statement. If the last definition type is determined to be a function definition, block 922 provides determining whether the watching variable is a parameter. If so, the caller functions associated with the parameter will be identified, and as shown in block 924, the used variables can be mapped to the caller function's parameters if any exist, and the working statement can be updated to the calling statement of the caller function. Next, the process continues with the calling statement prior to advancing to block 904, where the statement is added as a working statement to the working statement field of the table and the cross-layer analysis is repeated based on the added working statement. If the watching variable is determined not to be a parameter, the process ends at block 926, and the programmer can use the information collected in the table to generate cross-layer code points for debugging.

The sample code below provides an example of the parameter binding in accordance with an embodiment for cross-layer analysis:

```
Caller layer - native C++ code:
    (50) extern"C" {
    (51) void fortfunc_(int *ii, float *ff);
    (52) }
    ...
    (60) main( )
    (61) {
    (62) int cii=5;
    (63) float cff=5.5;
    (64) fortfunc_(&cii, &cff);
    (65) return 0;
    (65) }
Callee layer - native fortran code:
    (70) subroutine fortfunc(ii, ff)
    (71) integer ii
    (72) real*4 ff
    ...
    (80) write(6,100) ii, ff
    (81) 100 format('ii=',i2,' ff=',f6.3)
    (82) return
    (83) end
```

The sample code includes code that is written in two different code languages. The caller layer (lines (50)-(65)) is written in C++ code and the callee layer (lines (70)-(83)) is written in Fortran code. In this example, the C++ code calls the function "fortfunc_" in line (51). The parameters of the function "fortfunc_" will be mapped to the parameters of the Fortran function "fortfunc." In particular, the parameter "cii" will be mapped to "ii" and the parameter "cff" will be mapped to "ff."

An analysis in accordance with an embodiment will begin to search the function definition within the current layer. When the search fails, other layers will be searched. As the other layers are searched, and the "fortfunc" is found in line (71) of the callee layer. The analysis will continue processing the Fortran layer in accordance with an embodiment for the cross-layer analysis.

Another different example for specific language information analysis is provided. In this example, a function in python code makes a call to a function in C code. The sample code is provided as follows:

```
Caller layer - Python code:
    (20) import foo
    (21) (sum,sub) = foo.add_sub(9,3)
Callee layer - C code:
    (30) static PyObject* foo_add_sub(PyObject* self, PyObject* args) {
    (31) int num1,num2;
    (32) if (PyArg_ParseTuple(args, "ii", &num1, &num2)) {
    (33)    return NULL;
    (34) }
    (35)    return Py_BuildValue("ii", num1 + num2, num1 - num2);
    (36) }
    ...
    (40) static PyMethodDef foo_methods[ ] = {
    (41) {"add_sub", (PyCFunction)foo_add_sub, METH_VARARGS, NULL},
    (42) {NULL,NULL,0,NULL}
    (43) };
    ...
    (50) PyMODINIT_FUNC initfoo( ) {
    (52)    Py_InitModule3("foo", foo_methods, "My first extension module.");
    (51) }
```

In this example, a first caller layer of code is provided in Python code and a second callee layer of code is provided in C code. During a code parsing process, information will be generated to show the relationship between the Python code function "foo.add_sub" and the C code function "foo_add_sub."

The language specific analysis reveals the Python function parameters are bound to the C function's local parameters ("num1" and "num2"). In this example, line (32) "PyArg_ParseTuple" is considered a definition of "num1" and "num2."

After binding the caller's parameters to the callee's local parameters, the analysis continues in accordance with one or more embodiments for the cross-layer analysis.

Most function calls across programming language boundary have fixed pattern. Such patterns can be summarized as language-to-language specific rules. Therefore, present invention is not limited in programming language provided by above examples. Generally, any programming language that can be compiled could applied with present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for generating breakpoints for cross-layer debugging, the computer implemented method comprising:
  receiving, by a processor, code comprising a plurality of layers, wherein each layer of the plurality of layers includes at least one statement;
  executing, by the processor, a static analysis of the code to obtain a use-definition (UD) chain, alias information, and a parameter mapping for each layer of the plurality of layers;
  determining, by the processor, a statement of the code that produces one of an error and a failure;
  generating, by the processor, a table comprising a plurality of fields including a working statement field, a watching variable field, and a watching function field;
  adding, by the processor, the determined statement of the code as a working statement to the working statement field of the table;
  adding, by the processor, a function associated with the determined statement of the code to the watching function field of the table;
  executing, by the processor, during runtime, a cross-layer analysis, wherein the cross-layer analysis comprises:
    adding, by the processor, from the working statement, at least one used variable and an associated alias of the at least one used variable from the working statement to the watching variable field of the table;
    searching, by the processor, the code based on the watching variable field of the table, wherein the searching includes searching at least one UD chain for a last definition of the watching variable field of the table; and determining, by the processor, a type of the last definition of the watching variable field of the table;

generating, by the processor, cross-layer suspect code breakpoints for use in cross-layer debugging based on the cross-layer analysis; and performing, by the processor, cross-layer debugging based at least in part on the cross-layer suspect code breakpoints.

2. The computer implemented method of claim 1, further comprising:

responsive to determining that a watching variable type of a watching variable includes a non-global symbol type, searching by the processor, up a current UD chain for a last definition of the watching variable from the working statement; and responsive to determining that the watching variable type of the watching variable includes a global symbol type, searching, by the processor, up UD chains of each function of the code for the last definition of the watching variable from the working statement.

3. The computer implemented method of claim 1, further comprising:

determining, by the processor, that the type of the last definition of the watching variable field of the table is a function call.

4. The computer implemented method of claim 1, further comprising:

determining, by the processor, that the type of the last definition of the watching variable field of the table is a function definition.

5. The computer implemented method of claim 1, further comprising:

determining, by the processor, that the type of the last definition of the watching variable field of the table is a normal statement.

6. The computer implemented method of claim 1, wherein the code comprises source code for each of a presentation layer, a business logic layer, and a data access layer, and wherein the determined statement of the code is located in the presentation layer of the code.

7. The computer implemented method of claim 1, wherein language specific knowledge is utilized to implement cross-layer debugging.

8. A computer program product for generating breakpoints for cross-layer debugging, said computer program product comprising:

a computer readable storage medium having stored thereon first program instructions executable by a processor to cause the processor to:

receive code comprising a plurality of layers, wherein each layer of the plurality of layers includes at least one statement;

execute a static analysis of the code to obtain a use-definition (UD) chain, alias information, and a parameter mapping for each layer of the plurality of layers;

determine a statement of the code that produces one of an error and a failure;

generate a table comprising a plurality of fields including a working statement field, a watching variable field, and a watching function field;

add the determined statement of the code as a working statement to the working statement field of the table;

add a function associated with the determined statement of the code to the watching function field of the table;

execute, during runtime, a cross-layer analysis, wherein the cross-layer analysis comprises:

adding, from the working statement, at least one used variable and an associated alias of the at least one used variable from the working statement to the watching variable field of the table;

searching the code based on the watching variable field of the table, wherein the searching includes searching at least one UD chain for a last definition of the watching variable field of the table; and determining a type of the last definition of the watching variable field of the table;

generate cross-layer suspect code breakpoints for use in debugging based on the cross-layer analysis; and perform cross-layer debugging based at least in part on the cross-layer suspect code breakpoints.

9. The computer program product of claim 8, wherein the first program instructions are further executable by the processor to cause the processor to:

responsive to determining that a watching variable type of a watching variable includes a non-global symbol type, searching up a current UD chain for a last definition of the watching variable from the working statement; and responsive to determining that the watching variable type of the watching variable includes a global symbol type, searching up UD chains of each function of the code for the last definition of the watching variable from the working statement.

10. The computer program product of claim 8, wherein the first program instructions are further executable by the processor to cause the processor to:

determine that the type of the last definition of the watching variable field of the table is a function call.

11. The computer program product of claim 8, wherein the first program instructions are further executable by the processor to cause the processor to:

determine that the type of the last definition of the watching variable field of the table is a function definition.

12. The computer program product of claim 8, wherein the first program instructions are further executable by the processor to cause the processor to:

determine that the type of the last definition of the watching variable field of the table is a normal statement.

13. The computer program product of claim 8, wherein the code comprises source code for each of a presentation layer, a business logic layer, and a data access layer, and wherein the determined statement of the code is located in the presentation layer of the code.

14. The computer program product of claim 8, wherein language specific knowledge is utilized to implement cross-layer debugging.

15. A system for generating breakpoints for cross-layer debugging, the system comprising:

a processor coupled to a computer readable storage medium; and an analyzer, when executed by the processor, configured to:

receive code comprising a plurality of layers, wherein each layer of the plurality of layers includes at least one statement;

execute a static analysis of the code to obtain a use-definition (UD) chain, alias information, and a parameter mapping for each layer of the plurality of layers;

determine a statement of the code that produces one of an error and a failure;

generate a table comprising a plurality of fields including a working statement field, a watching variable field, and a watching function field;

add the determined statement of the code as a working statement to the working statement field of the table;

add a function associated with the determined statement of the code to the watching function field of the table;

execute, during runtime, a cross-layer analysis, wherein the cross-layer analysis comprises:
  adding, from the working statement, at least one used variable and an associated alias of the at least one used variable from the working statement to the watching variable field of the table;
  searching the code based on the watching variable field of the table, wherein the searching includes searching at least one UD chain for a last definition of the watching variable field of the table; and
  determining a type of the last definition of the watching variable field of the table;

generate cross-layer suspect code breakpoints for use in debugging based on the cross-layer analysis; and perform cross-layer debugging based at least in part on the cross-layer suspect code breakpoints.

16. The system of claim 15, wherein the analyzer, when executed by the processor, is further configured to:
  responsive to determining that a watching variable type of a watching variable includes a non-global symbol type, searching up a current UD chain for a last definition of the watching variable from the working statement; and
  responsive to determining that the watching variable type of the watching variable includes a global symbol type, searching up UD chains of each function of the code for the last definition of the watching variable from the working statement.

17. The system of claim 15, wherein the analyzer, when executed by the processor, is further configured to:
  determine that the type of the last definition of the watching variable field of the table is a function call.

18. The system of claim 15, wherein the analyzer, when executed by the processor, is further configured to:
  determine that the type of the last definition of the watching variable field of the table is a function definition.

19. The system of claim 15, wherein the analyzer, when executed by the processor, is further configured to:
  determine that the type of the last definition of the watching variable field of the table is a normal statement.

20. The system of claim 15, wherein the code comprises source code for each of a presentation layer, a business logic layer, and a data access layer, and wherein the determined statement of the code is located in the presentation layer of the code.

* * * * *